(12) United States Patent
Catoe

(10) Patent No.: US 8,825,531 B1
(45) Date of Patent: Sep. 2, 2014

(54) AUTOMATED SELF-CHECKOUT SYSTEM

(75) Inventor: Peter Terry Catoe, Blowing Rock, NC (US)

(73) Assignee: ECR Software Corporation, Boone, NC (US)

(*) Notice: Subject to any disclaimer, the term of this patent is extended or adjusted under 35 U.S.C. 154(b) by 0 days.

(21) Appl. No.: 13/106,090

(22) Filed: May 12, 2011

(51) Int. Cl.
*G06Q 20/00* (2012.01)
*G06K 15/00* (2006.01)

(52) U.S. Cl.
USPC ............................................. 705/16; 235/383

(58) Field of Classification Search
None
See application file for complete search history.

(56) References Cited

U.S. PATENT DOCUMENTS

| | | | |
|---|---|---|---|
| 3,878,365 A | 4/1975 | Schwartz | 235/61.7 |
| 4,819,162 A * | 4/1989 | Webb et al. | 705/32 |
| 5,083,638 A | 1/1992 | Schneider | 186/61 |
| 5,426,282 A * | 6/1995 | Humble | 235/383 |
| 5,769,269 A * | 6/1998 | Peters | 221/7 |
| 5,992,570 A * | 11/1999 | Walter et al. | 186/36 |
| 6,047,262 A | 4/2000 | Lutz | 705/16 |
| 6,080,938 A | 6/2000 | Lutz | 177/25.15 |
| 6,354,498 B1 * | 3/2002 | Lutz | 235/385 |
| 6,571,218 B1 * | 5/2003 | Sadler | 705/16 |
| 7,024,394 B1 * | 4/2006 | Ashour et al. | 705/64 |
| 7,044,370 B2 | 5/2006 | Bellis, Jr. et al. | 235/383 |
| 7,048,184 B2 * | 5/2006 | Persky | 235/383 |
| 7,114,656 B1 | 10/2006 | Garver | 235/462.46 |
| 7,399,220 B2 * | 7/2008 | Kriesel et al. | 452/157 |
| 7,416,117 B1 * | 8/2008 | Morrison | 235/383 |
| 7,621,446 B2 * | 11/2009 | Addison et al. | 235/383 |
| 7,648,064 B2 | 1/2010 | Lamparello et al. | 235/382 |
| RE41,093 E * | 2/2010 | Lutz et al. | 186/61 |
| 7,673,796 B2 | 3/2010 | Kobres et al. | 235/383 |
| 7,780,081 B1 * | 8/2010 | Liang | 235/383 |
| RE41,717 E * | 9/2010 | Dejaeger | 235/383 |
| 7,866,546 B1 * | 1/2011 | Vance | 235/379 |
| 8,108,927 B2 * | 1/2012 | Michelle et al. | 726/21 |
| 8,234,374 B2 * | 7/2012 | Marcjan et al. | 709/225 |
| 2002/0103708 A1 * | 8/2002 | Kloubakov et al. | 705/21 |
| 2002/0194074 A1 * | 12/2002 | Jacobs | 705/16 |
| 2003/0018897 A1 * | 1/2003 | Bellis et al. | 713/182 |
| 2003/0078849 A1 * | 4/2003 | Snyder | 705/23 |
| 2003/0121974 A1 * | 7/2003 | Blanford et al. | 235/383 |
| 2003/0125974 A1 * | 7/2003 | Frich | 705/1 |
| 2003/0149630 A1 * | 8/2003 | Jacobs et al. | 705/17 |
| 2004/0041021 A1 * | 3/2004 | Nugent, Jr. | 235/383 |
| 2004/0069848 A1 * | 4/2004 | Persky | 235/383 |
| 2004/0083170 A1 * | 4/2004 | Bam et al. | 705/40 |
| 2004/0133477 A1 * | 7/2004 | Morris et al. | 705/21 |
| 2005/0251675 A1 * | 11/2005 | Marcjan et al. | 713/100 |
| 2005/0288964 A1 * | 12/2005 | Lutzen et al. | 705/2 |
| 2006/0043174 A1 * | 3/2006 | Banavar et al. | 235/383 |
| 2006/0080177 A1 * | 4/2006 | Walter et al. | 705/23 |
| 2006/0293984 A1 * | 12/2006 | Loch et al. | 705/35 |
| 2007/0205277 A1 * | 9/2007 | Tashiro | 235/383 |
| 2007/0235531 A1 * | 10/2007 | Addison et al. | 235/383 |

(Continued)

*Primary Examiner* — Mussa A Shaawat
(74) *Attorney, Agent, or Firm* — MacCord Mason PLLC

(57) ABSTRACT

The invention includes a system and method for an automated self-checkout system. The system includes a self-checkout housing, a means for inputting information, a means for receiving payment, a means for providing information to a customer, and a controller operatively connected to the means for inputting, means for receiving and the means for providing information to the customer. Additionally, the controller includes a reset module that responds to input inactivity prior to completion of the purchaser transaction by voiding the transaction and resetting the display to start a new transaction. The invention may also include a security verification mechanism.

18 Claims, 5 Drawing Sheets

(56) References Cited

U.S. PATENT DOCUMENTS

| | | | |
|---|---|---|---|
| 2008/0005036 A1* | 1/2008 | Morris | 705/64 |
| 2008/0052160 A1* | 2/2008 | Forlai | 705/14 |
| 2008/0061139 A1 | 3/2008 | Roquemore | 235/383 |
| 2008/0162292 A1* | 7/2008 | Roshandel | 705/16 |
| 2008/0212591 A1* | 9/2008 | Wu et al. | 370/395.21 |
| 2008/0265020 A1* | 10/2008 | Copeland et al. | 235/380 |
| 2009/0083851 A1* | 3/2009 | Michelle et al. | 726/21 |
| 2009/0094128 A1* | 4/2009 | Kloubakov et al. | 705/21 |
| 2009/0188975 A1 | 7/2009 | Fergen et al. | 235/385 |
| 2009/0288012 A1* | 11/2009 | Hertel et al. | 715/738 |
| 2010/0114746 A1* | 5/2010 | Bobbitt et al. | 705/35 |
| 2010/0206951 A1* | 8/2010 | Herwig | 235/439 |
| 2011/0034223 A1* | 2/2011 | O'Leary et al. | 463/2 |
| 2011/0145049 A1* | 6/2011 | Hertel et al. | 705/14.23 |
| 2012/0022933 A1* | 1/2012 | Forlai | 705/14.23 |
| 2012/0022934 A1* | 1/2012 | Forlai | 705/14.23 |
| 2012/0022935 A1* | 1/2012 | Forlai | 705/14.23 |
| 2012/0130894 A1* | 5/2012 | Pendleton | 705/43 |
| 2012/0265628 A1* | 10/2012 | Jacobs | 705/23 |
| 2012/0267432 A1* | 10/2012 | Kuttuva | 235/379 |
| 2012/0310410 A1* | 12/2012 | Adams et al. | 700/237 |

* cited by examiner

AUTOMATED SELF-CHECKOUT SYSTEM

FIELD OF TECHNOLOGY

The current disclosure relates generally to systems and methods for automated self-checkouts, and more particularly to unattended self-checkout systems and methods including automatic void and reset features.

BACKGROUND

In a retail type environment, the efficiency with which consumers are able to process, pay for and purchase their desired items factors into the expenses for a retail type establishment. The labor hours attributable to maiming checkout counters contributes greatly to this expense. In a typical retail operation, a shopper gathers the items desired for purchase and presents them at a checkout counter, a clerk then scans or enters the items' barcodes and the point-of-sale (POS) system totals the shopper's bill. The clerk may apply any promotional discounts to the bill, the shopper tenders payment and the items may be bagged for the customer. A number of self-service automated checkout terminal concepts have been developed in an attempt to reduce the need for a check-out clerk, thus reducing associated labor costs.

Toward reducing operating expenses, some businesses have implemented self-checkout counters that substitute for individual clerks and baggers at each checkout terminal. Self-checkout terminals are systems which are operated mainly by a customer without the direct aid of a checkout clerk. In such a system, the customer scans, selects or enters individual items for purchase, for example, across a scanner or screen and then places the selected items into a grocery type bag, if desired. The customer then pays for his or her purchase either at the self-service checkout terminal or at a central payment area. Thus, a self-service checkout terminal permits a customer to select, itemize and even pay for his or her purchases without the direct assistance of the retailer's personnel at each individual checkout terminal.

A customer typically has little or no training in the operation of a self-service checkout terminal and customers may make errors when checking out their items. One concern that retailers have when evaluating a self-service checkout terminal is the level of assistance to be provided to inexperienced customers and the amount of supervision required for automated checkout systems.

Moreover, it is also known that some customers have improper intentions when using a self-service checkout terminal and may attempt to shortchange or "walk-away" from a terminal prior to paying for their items. In traditional check-out systems, the clerk employed by the retailer to operate the checkout terminal provides a level of security against impropriety. As a result, it has been viewed as desirable to retain at least one clerk for oversight of multiple self-service checkout terminals.

There are, however, other legitimate situations when a customer may walk-away from a checkout terminal prior to completion of a transaction. For example, before tendering payment, a customer may realize that he or she forgot an item and may therefore return to the shopping area to retrieve the additional item before completing the transaction.

It is difficult to determine whether a consumer is engaging in a legitimate delay at a self-checkout terminal. Therefore, regardless of the reason that a consumer walks away or the transaction is delayed, it is viewed as desirable for a self-checkout terminal to be left in an idle or locked mode, requiring manual reset, before another transaction may progress. Thus, while each self-checkout terminal may not have a clerk present, there is still an attendant responding to the self-checkout terminals either remotely or on-the-spot.

For various reasons, such as, concerns regarding theft, the inability to determine the reason for the walk-away, operational assistance and the desire in the field to retain at least one attendant for oversight of the self-checkout terminals, a point of human oversight has remained at self-checkout terminals. A problem that is created however is that throughput, a main advantage of self-checkout terminals, may be greatly hindered. Applicant believes that there are retail and vending scenarios where a completely automated self-checkout system, without a dedicated oversight attendant or with greatly reduced attendant participation, would be beneficial.

Applicant believes that in certain vending and retail scenarios, security to an automated self-service POS machine may be adequately provided through means other than locking or initiating an idle mode in the machine. In fact, locking the machine may discourage consumers from using self-service checkouts in certain scenarios. In some vending environments, such as in a hotel, business lobby or a hospital, offering items for purchase, such as fresh food items, in an open display along with an automated self-service checkout may encourage sales as against the traditional vending machine. However, an automated self-checkout in such an unattended vending scenario would not function well if it locked or went into an idle mode at every walk-away or delay during the transaction. Purposefully designing an automated self-checkout to void and reset runs counter to the idea that it is desirable for a self-checkout POS machine to become idle or to lock in order to alert a supervisor in the case of a delay.

The current self-checkout systems often still require a high degree of store employee or operator intervention. A large variety of differing types of transactions must be handled by the automated check-out system. Because a machine lacks the judgment of a human being, these systems tend to be inflexible so completely automated systems are difficult to develop. Hence, a need exists for a system that provides more efficient throughput, minimizes or eliminates the required human supervision and retains adequate security.

SUMMARY OF THE INVENTION

The present invention is directed to one or more of these needs in the art. Accordingly, one aspect of the present invention provides an automated self-checkout system including a self-checkout housing, a means for inputting information about products being purchased in a transaction, a means for providing information to a customer during the transaction and a controller operatively connected to the means for inputting, the means for receiving and the means for providing information. The controller has programming arranged to process information from the means for inputting and compiles a list of information for the products being purchased in the transaction to allow calculation of a total amount due for the transaction. The controller also has programming to provide to a customer, on the means for providing information, an amount due for the transaction, enabling payment by the customer by use of the means for receiving payment to complete a purchaser transaction. Additionally, the controller includes a reset module that responds to a period of input inactivity by the purchaser before completion of the purchaser transaction to void a purchaser transaction and reset the display to start a new transaction. In one embodiment, the reset module may be arranged to include a time-out warning on the means for providing information prior to voiding a purchaser transaction and resetting the display to start a new transaction.

The automated self-checkout system may also include a checkout security.

The present invention may also be considered a method for an automated self-checkout including receiving an identification input of sale items a purchaser is purchasing; processing the identification input in a controller arranged to process input information and prepare a transaction detail that provides the purchaser with at least a summary of the items and the cost of the items being purchased; generating a purchaser transaction detail; presenting a purchaser with the purchaser transaction detail; receiving a payment for the purchaser transaction; processing the payment in relation to the purchaser transaction in the controller; and controlling a reset module that responds to a period of input inactivity by the purchaser before completion of the purchaser transaction to void a transaction and reset the display to start a new transaction.

These and other aspects of the present invention will become apparent to those skilled in the art after a reading of the following description of the preferred embodiment when considered with the drawings.

BRIEF DESCRIPTION OF THE DRAWINGS

The invention will be better understood by a reading of the Detailed Description of the Examples of the Invention along with a review of the drawings, in which.

DETAILED DESCRIPTION OF THE PREFERRED EMBODIMENTS

It will be understood that the illustrations are for the purpose of describing a preferred embodiment of the invention and are not intended to limit the invention thereto.

Figure 1:
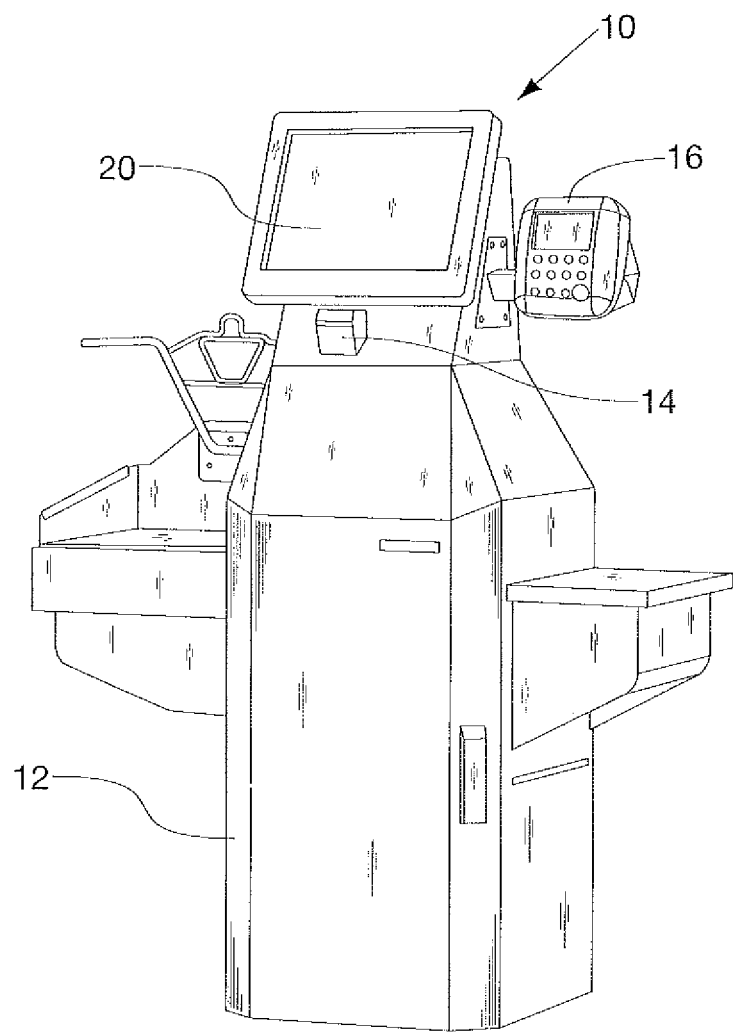
FIG. 1 is a perspective view of an automated self-checkout system according to the present invention.
Figure 2:
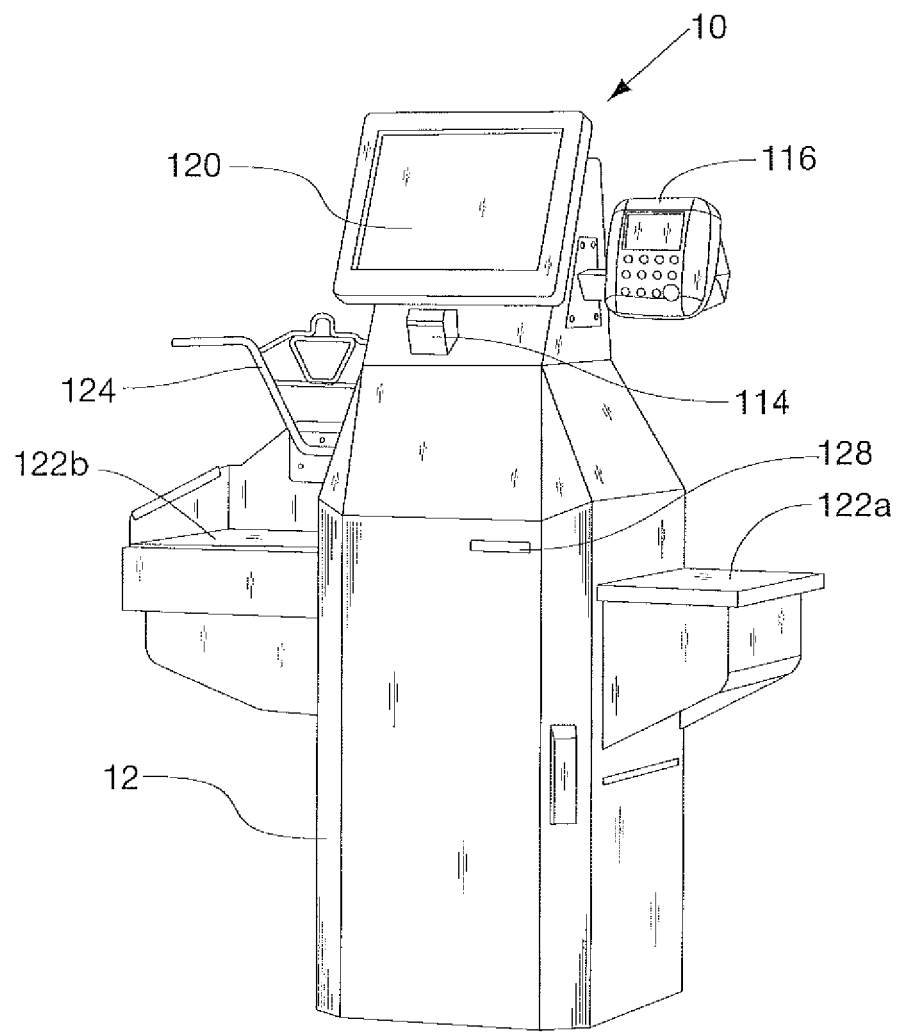
FIG. 2 is a perspective view of an alternate embodiment of a self-checkout system according to the present invention.

As illustrated in FIGS. 1 and 2, an automated self-checkout system, generally designated 10, is constructed according to one embodiment of the invention. The system 10 includes a housing 12, typically of compact design, which accommodates or houses the other aspects of the self-checkout system. The housing 12 may be a pre-existing structure at the installation site of the self-checkout system, may resemble the housing as shown in FIG. 1, or may take on other shapes able to accommodate the other aspects of the invention.

The system 10 also includes a means for a customer to input information 14, a means for receiving payment 16, a means for providing information to a customer 20 and a controller 40 (not visible in FIG. 1 or 2). The means for inputting information 14 may typically be supported on, integral to, or attached to the housing 12. The means for inputting information 14 is arranged to accept input from items being purchased by recognizing the item, such as through selection on the display 120 by the customer or by recognition of an identification or code 114. A bar code scanner 114 would be one example of a means for inputting information suitable for system 10. Other examples may include one or more keypads to key in information, RFID reader, a microphone with voice recognition software, a touch screen keypad, a video camera, tablet computer, wireless communication receiver, and/or a mobile phone.

A means for providing information to the customer 20, is arranged to provide and receive information during a transaction. The means for providing information 20 may be used to provide instructions to the purchaser or to provide feedback from input received from the means for inputting information 14. For example, the identification and recorded price of scanned items may be displayed to the customer. In the case of a touch screen display 120, purchasers may also input information into the means for providing information 20 regarding the transaction (see FIG. 2). A display 120, or a loud speaker (not shown) may be an example of ways to provide information to a customer during a transaction. Other means of providing information to the customer may include a private printing page, a wireless link transmitting to a handheld device such as a mobile phone or tablet computer or the like.

A means for receiving payment 16 is arranged to accept payment for the items being purchased. A purchaser initially provides input to the system 10 through a means for inputting information 14. The means for providing information 20 provides feedback to the purchaser throughout the transaction and may receive input from the purchaser during the transaction. When all of the items to be purchased have been included in the transaction, the total purchase price for those items is computed and made available on the means for providing information 20. The total purchase price can reflect discounts for coupons, sale items or other discounts and additions such as sales tax. The purchaser may provide a payment, in any of a number of various forms, through the means for receiving payment 16. Means for receiving payment 16 may be a credit card reader 116, a debit card reader 116, a smart card reader, a cash receiver, a wireless transmission and more than one of these in any combination. The proceeding, discussing FIGS. 1 and 2, reflect conventional self-checkout technology.

Figure 3:
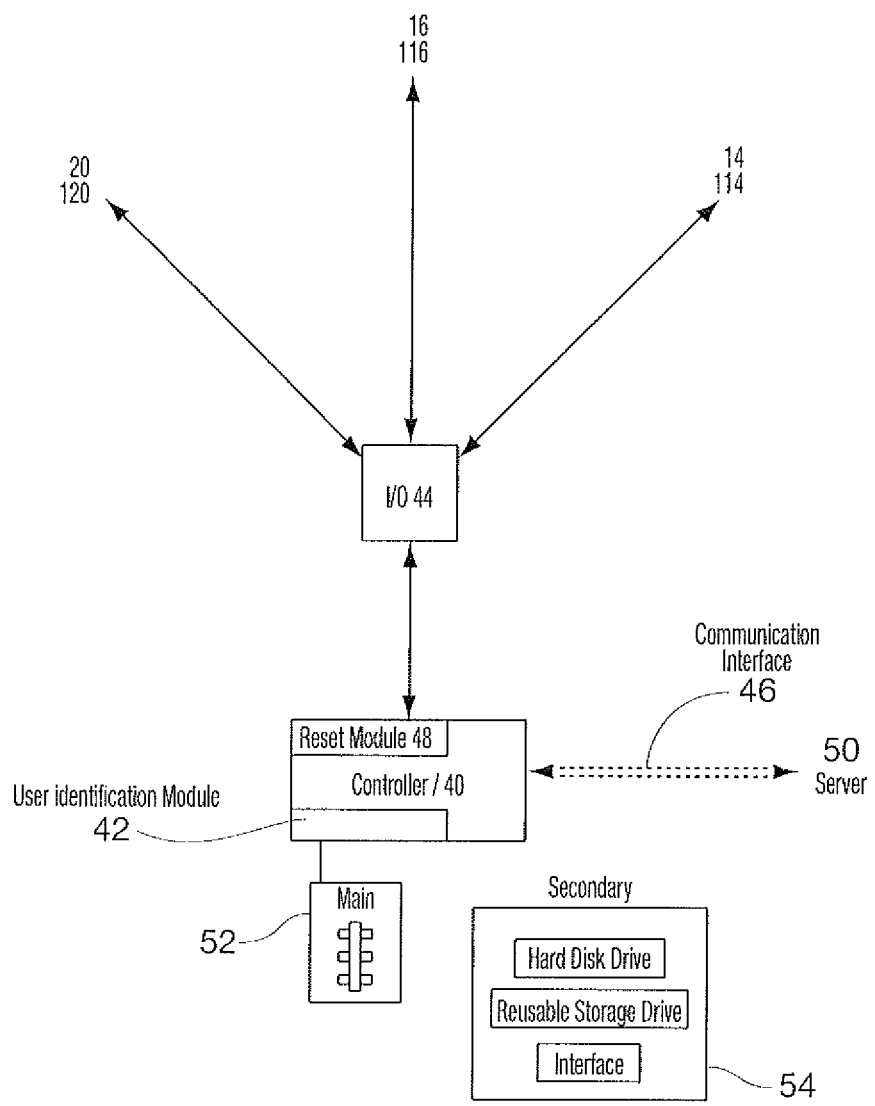
FIG. 3 is an illustration of an exemplary set of component parts for the self-checkout system of FIG. 1 and FIG. 2.

As illustrated in FIG. 3, a controller 40 is operatively connected to the means for inputting information 14, the means for receiving payment 16 and the means for providing information 20. The controller 40 has programming arranged to process information from the means for inputting information 14 and compile information for the items being purchased in the transaction to allow calculation of a total amount due for the transaction and to provide on the means for providing information 20 an amount due for the transaction, enabling payment by the customer by use of the means for receiving payment 16 to complete a purchaser transaction.

The programming of controller 40 includes a reset module 48 that responds to a period of input inactivity by the purchaser before completion of the purchaser transaction to potentially void a purchaser transaction and reset the means for providing information 20 to start a new transaction.

As best seen in FIG. 3, the controller 40 includes an associated memory 52. The controller includes input/output ports (I/O 44) in order to receive information from and to provide information to devices included in the system 10. By way of example, the controller 40 receives information from the means for inputting 14 and the means for receiving payment 16 and provides data to the means for providing information 20. The controller 40 typically has a clock component so that elapsed time between events can be determined. Other configurations of times can be used. As will be apparent, the programming of the controller will make use of such determinations of elapsed time between events and compare the determined amounts of time with certain thresholds discussed infra.

A communication interface 46 is provided so that controller 40 can transmit and receive information to and from another server 50. The controller may be able to assess whether or not communication link 46 is disconnected at any point in time. In one embodiment, when communication link 46 is disconnected, controller 40 may be able to direct a purchaser transaction and store in memory the transaction until at least the time when communication link 46 is restored.

The computer system may include a main memory 52 or a secondary memory 54, or both, that may communicate with the controller 40. The main memory 52 is generally a random access memory (RAM) that may include an item buffer for temporarily holding identification information corresponding to scanned items before the items are verified by the self-checkout system 10. On the other hand, the secondary memory 54 with standard input/output ports may include any storage medium such as but not limited to a hard disk drive, a SCSI drive, a removable storage drive or removable storage units and interface. Alternatively, the secondary memory 54 may include handheld computing devices, as well as, one or more databases such as a look-up database that includes SKU number, price, item codes, tolerance range for the item or for a class of items, and corresponding weight, height, length, or width for each item in the store. This database may reside on one or more of different or additional computers such as at a central store server or a remote server outside of the location.

Additionally, it is contemplated that the checkout system 10 may not include a main memory 52. In this situation, the controller 40 may communicate with the secondary memory 54 which may be a remote server, for example, accessed via local area network or global networking such as the Internet or Intranet, and refresh a display screen with information and software stored in the remote server.

Figure 4:
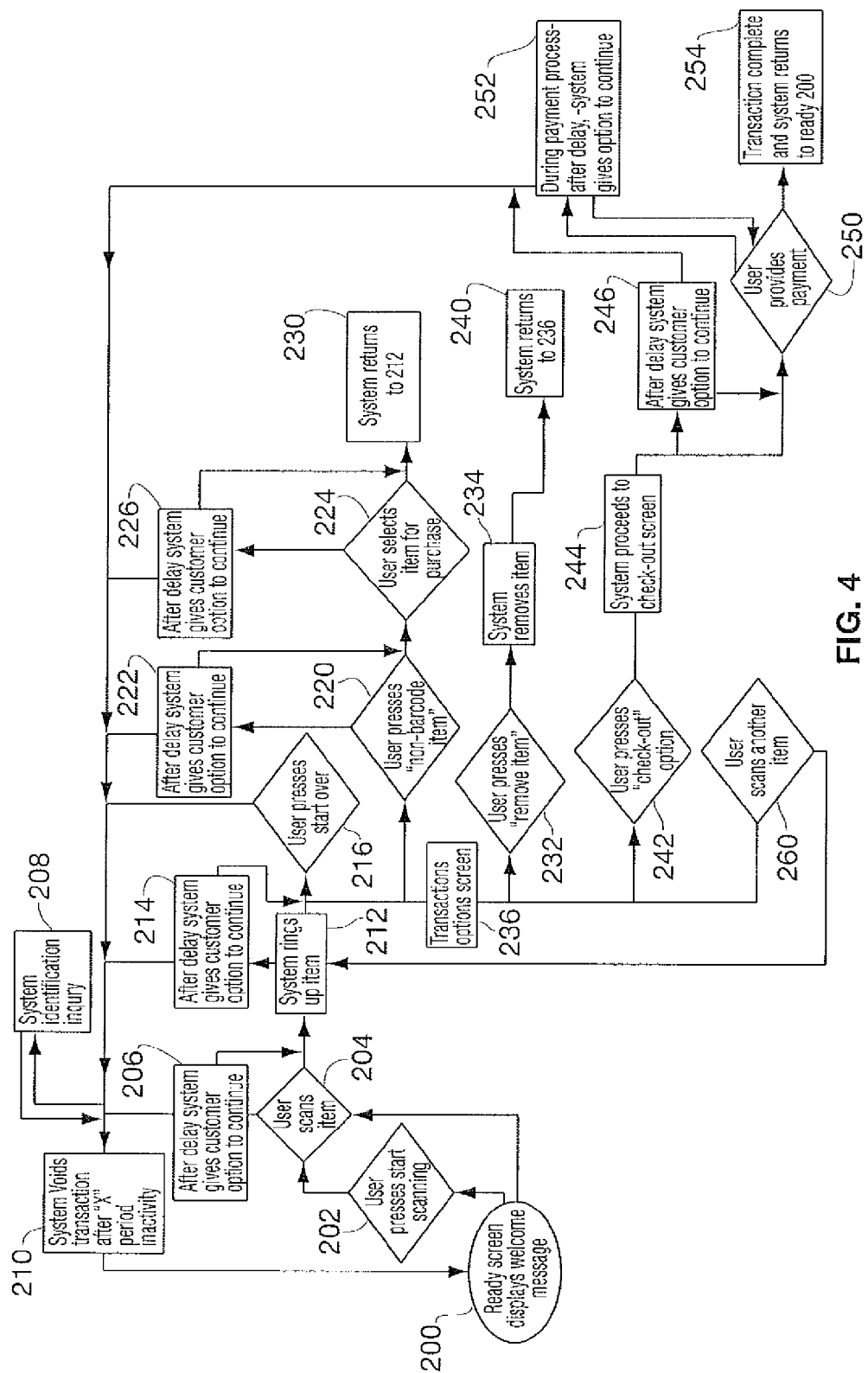
FIG. 4 is a flow chart showing a void and reset during a purchaser transaction which may be performed by the automated self-checkout system of FIG. 1 and FIG. 2.

The controller 40 directs a purchaser transaction, for example, by way of the flow chart shown in FIG. 4. A customer selects a number of items for purchase and approaches the automated self-checkout system 10. A "ready" screen 200, such as on the means for providing information 20, displays a welcome message indicating that the system is set to begin a new customer transaction. The customer or user may select a "start scanning" option 202 on the ready screen 200 or the means for inputting information or may simply begin scanning an item 204. Once a user begins the transaction by way of scanning an item 204 or selecting "start scanning" 202, the controller 40 monitors the progression of the transaction for a predetermined period of inactivity by the user. If the predetermined period of inactivity reaches a preset threshold, then the user is presented with an option to continue the transaction 206. Absent a response from the user within a further time period, the controller activates the reset module 48 which voids the current user transaction 210 and returns the system 10 to the ready state 200.

The surrounding environment in which the system 10 is placed may lead to the selection of differing inactivity time thresholds. While the time periods may be adjustable, in one example the controller 40 is set to detect a 20 second inactivity delay. Upon detecting such a delay, the controller 40 directs the means for providing information 20 to display or inquire of the user whether the user wishes to continue. Typically, the customer is provided an additional 10 second time period in which to respond before the reset module voids the transaction 210 and returns the system 10 to the ready position 200.

In the case where after scanning a first item there is no delay detected or when the customer opts to continue a delayed transaction 206, the system recognizes the inputted item for purchase and the controller 40 directs the system 10 to ring up the item for purchase 212.

After the item for purchase is logged in the system 10, the purchaser may have options, among others, to select to start the transaction over 216, to enter a non-barcoded item 220, to remove an item 232, to scan another item 260 or to proceed to checkout 232. If the user fails to respond by a preset period of time, then the user is given the option of continuing the transaction 222 before the controller directs the reset module 48 to void and return the transaction to the ready screen position 200. If the user chooses to start the transaction over 216, then the controller also directs the transaction to void 210 and return to the ready screen 200.

In the case where the user selects a non-bar coded item for purchase 220, then the user may be given an option of selecting the item, for example by number or name 224. Unless a delay is detected by the controller 40, the system rings in the item selected 230 and the user is presented again with various transaction options. A threshold delay will prompt an inquiry regarding continuing the transaction 226 and, absent a response, will initiate the void and reset module 210.

If the user selects for an item to be removed 232, the system will remove the item 234 from the list of items being purchased and return to the transaction options screen 236.

The user may also scan or input another item for purchase 260. The controller enters the item into the system for purchase 212. If the user has inputted all items for purchase, then the check-out option may be selected 242. The controller 40 directs a check-out screen to be displayed 244 and total cost for the purchase to be presented. The user is prompted to provide payment 250. The customer's payment may be received by the automated check-out system in a variety of forms which are conventionally known. By way of example, payment may be by credit card reader, a debit card reader, a smart card reader, a cash receiver, a wireless deposit of funds, and more than one of these.

Once payment is received, the transaction is complete 254, and the controller 40 directs the system to return to the ready screen 200. If a delay surpasses a preset period of time threshold during any point of the checkout process, then the customer may be given an option to continue 252 before the controller 40 directs the reset module to void the transaction 210 and return to the ready screen 200.

Optionally, the controller 40 may direct a user identification module 42 (as seen in FIG. 3) which allows identification of a customer or transaction at some point during the transaction. When the user identification module 42 is active, the customer may identify themselves, for example, by scanning a pre-paid card or discount customer card, or by entry of a customer number. Additionally, a transaction identification code may be provided to the customer by the system 10. The identification module 42 may provide a security measure to the system 10 by requiring the customer to provide their user identification prior to allowing continuation of a delayed transaction (208 of FIG. 4). If the system 10 detects that the entered identification code matches the transaction, then the user can continue with the transaction unhindered. Otherwise, the system will proceed to void and reset 210 the transaction. An incorrect user identification entry may trigger the void and reset as well as generation or acceptance of a new user identification to begin a new transaction. If no user identification is associated with a transaction, then a continuation may be allowed without requiring entry of a user identification.

The steps as illustrated in the flow chart of FIG. 4 may be combined in differing ways, some steps omitted or others added and still remain within the scope of this invention. FIG. 4 presents the steps representative of a preferred embodiment. The reset and void module of the software may be directed to void and reset the system transaction after any delay in the customer transaction so as to avoid placing the system in a locked or idle mode.

As seen in FIG. 2, the system 10 may include checkout security. The checkout security may be an automatic weight detection feature such as scales 122a and 122b in the bagging station on the housing 10. The items for purchase may be weighed and then the weight compared with the items as bagged and/or as recalled from memory upon scanning. If the weight varies by more than a threshold amount, an alarm may activate, as is conventional.

The checkout security may also include a surveillance monitor, a sensor monitor, a proximity sensor, and more than one of these. A monitor may be arranged so that it becomes active when a purchaser transaction begins. By way of example, the controller 40 may direct a surveillance monitor to turn on and to video record the purchaser transaction when a transaction begins. The controller 40 may then direct the video recorder to become inactive when the purchaser transaction is complete. There are problems associated with using video recording to monitor purchaser transactions at an automated checkout system because continual recording requires extremely large video storage capacity. By controlling when the recorder is actively recording and associating the recording intervals with customer transactions, the required video storage capacity may be significantly decreased. A proximity sensor (128 in FIG. 2), by way of example, may include a monitor that detects movement, light and/or distance. The proximity sensor may individually or in conjunction with a timer communicate with the controller 40 to initiate a transaction and/or a continue inquiry and a void/reset sequence.

It is also contemplated that the proximity sensor 128 could communicate with the controller 40 to initiate video recording of the transaction. A sensor monitor could also include a pressure detection device that indicates when a customer has approached the system.

Figure 5:
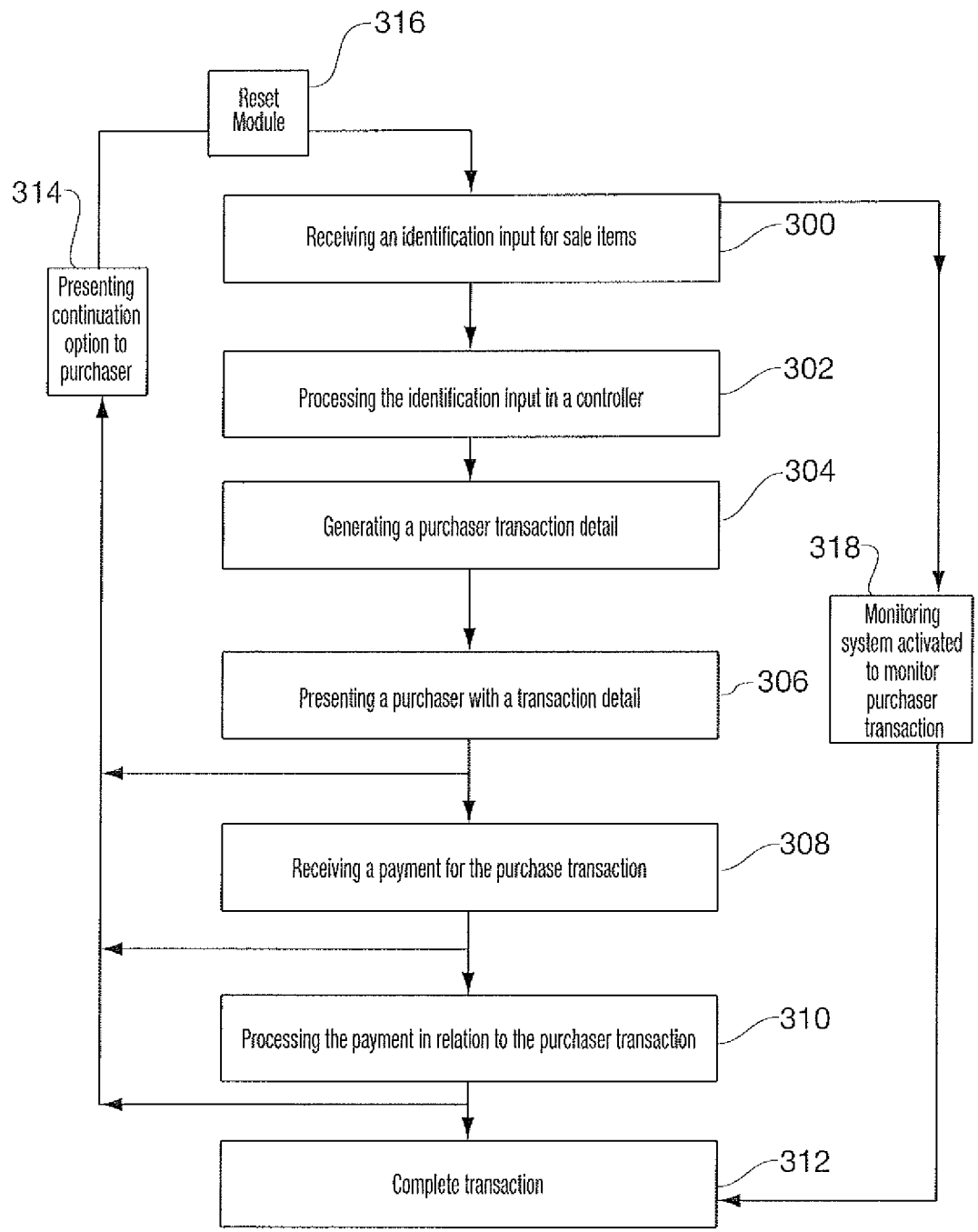
FIG. 5 is a flow chart of an automate self-checkout method according to the present invention.

The present invention may also be considered a method for an automated self-checkout, as exemplified in FIG. 5, including receiving an identification input about items selected for a purchaser transaction 300; processing the identification input in a controller 40 arranged to process input information and prepare a transaction detail 302; generating a purchaser transaction detail 304; presenting a purchaser with the purchaser transaction detail 306; receiving a payment for the purchaser transaction 308; processing the payment in relation to the purchaser transaction in the controller 310; and controlling a reset module that responds to a period of input inactivity by the purchaser before completion of the purchaser transaction to void a purchaser transaction and reset the display to start a new transaction 316.

Controlling the reset module may also include presenting a continuation screen option wherein the user may proceed with the current transaction prior to voiding a purchaser transaction and resetting the display to start a new transaction 314.

The method for an automated self-checkout may also include monitoring the purchaser transaction 318 wherein the controller 40 directs a monitoring system to monitor and record the purchaser transaction and to conclude monitoring upon completion of the purchaser transaction or upon reset.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. An automated self-checkout system comprising:
a self-checkout housing for use by a customer or person in tangible store;
a means for inputting information about products being purchased in a self-checkout transaction at the self-checkout housing;
a means for receiving payment for the products being purchased in the self-checkout transaction at the self-checkout housing;
a means for providing information to a customer during the self-checkout transaction at the self-checkout housing; and
a controller operatively connected to the means for inputting, the means for receiving, and the means for providing information,
wherein the controller has programming arranged to process information from the means for inputting and compiles information for the products being purchased in the self-checkout transaction to allow calculation of a total amount due for the transaction, and to provide to a customer on the means for providing information an amount due for the transaction, enabling payment by the customer by use of the means for receiving payment to complete a purchaser transaction at a self-checkout in the tangible store;
the controller programming having a reset module that responds to a period of input inactivity by the purchaser at any time at the retail self-checkout in the tangible store before completion of the purchaser self-checkout transaction to void a purchaser self-checkout transaction and reset the means for providing information to start an entirely new self-checkout transaction;
wherein the reset module is arranged to include a time-out warning to the purchaser on the means for providing information prior to voiding a purchaser in-store retail self-checkout transaction and resetting the display to start a new self-checkout transaction, and
a reset module override that is arranged to prevent a void and reset of a retail self-checkout transaction when the purchaser responds to the time-out warning within a predetermined period of time.

2. The automated self-checkout system of claim 1 further including a checkout security.

3. The automated self-checkout system of claim 2 wherein the checkout security includes an automatic weight detection feature.

4. The automated self-checkout system of claim 3 wherein the automatic weight detector feature includes a sensor for determining when a customer has approached the self-checkout system.

5. The automated self-checkout system of claim 3 further including a proximity sensor for sensing when a customer has approached the self-check system.

6. The automated self-checkout system of claim 1 wherein the means for inputting information about products is selected from the group consisting of an identification code reader arranged to read input of identifications on articles for sale, manual input, a cellular phone, wireless communication receiver, and more than one of these.

7. The automated self-checkout system of claim 1 wherein the means for receiving payment is selected from the group consisting of a credit card reader, a debit card reader, a smart card reader, a cash receiver, a wireless transfer of funds and more than one of these.

8. The automated self-checkout system of claim 1 wherein the means for providing information is selected form the group consisting of a video monitor display, a wireless transmission, a paper printout and more than one of these.

9. The automated self-checkout system of claim 1 wherein the controller further includes a user identification module.

10. The automated self-checkout system of claim 1 wherein the reset module is arranged to include a continue option prior to voiding a purchaser transaction and resetting the display to start a new transaction.

11. The automated self-checkout system of claim 10 wherein the controller is arranged to require a user identification entry before allowing a continuation of the transaction.

12. The automated self-checkout system of claim 11 wherein the controller is arranged to activate the void and reset module if an incorrect user identification entry is detected.

13. The automated self-checkout system of claim 12 wherein the checkout security is selected from the group consisting of a surveillance monitor, a sensor monitor, proximity sensor, and more than one of these.

14. An automated self-checkout system comprising:
a self-checkout housing for use by a customer in-person in a tangible store;
an input reader arranged to accept input about items being purchased in a self-checkout transaction at the self-checkout housing;
a payment acceptor at the self-checkout housing arranged to accept payment for the items being purchased in the self-checkout transaction;
a display at the self-checkout housing arranged to provide and receive information during the self-checkout transaction; and
a controller operatively connected to the input reader, the payment acceptor, and the display,
wherein the controller has programming arranged to process information from the input reader and compile information for the products being purchased in the self-checkout transaction to allow calculation of a total amount due for the transaction, and to provide to a customer on the display an amount due for the transaction, enabling payment by the customer by use of the payment acceptor to complete a purchaser transaction;
the controller having a reset module that responds to a period of input inactivity by the purchaser at any time before completion of the purchaser transaction to void a purchaser's self-checkout transaction and reset the display to start a new self-checkout transaction,
wherein the reset module is arranged to include a time-out warning to the purchaser on the retail self-checkout housing prior to voiding the purchaser's in-person self-checkout transaction and resetting the display to start an entirely new self-checkout transaction; and
a reset module override that is arranged to prevent a void and reset of a retail self-checkout transaction when the purchaser responds to the time-out warning within a predetermined period of time.

15. An automated self-checkout method comprising:
receiving an identification input for sale items involved in a purchaser self-checkout transaction at a self-checkout housing by reading the identification input on the item handled by the purchaser;
processing the identification input in a controller arranged to process input information and prepare a self-checkout transaction detail;
generating a purchaser self-checkout transaction detail;
presenting a purchaser with the purchaser transaction detail on a means for providing information to a customer during the self-checkout transaction at the self-checkout housing;
controlling a reset module that responds to a period of input inactivity by the purchaser at the self-checkout housing at any time at the retail self-checkout before completion of the in-person purchaser transaction to void a purchaser transaction and reset the display to start a new self-checkout transaction,
including presenting the purchaser a time-out warning at the self-checkout housing prior to voiding a purchaser transaction and resetting the display to start a new self-checkout transaction, and
programming a reset module override that is arranged to prevent a void and reset of a retail self-checkout transaction when the purchaser responds to the time-out warning within a predetermined period of time.

16. The automated self-checkout method of claim 15 wherein the time-out warning presents a continuation screen option wherein the user may proceed with the current transaction instead of voiding the purchaser transaction and resetting the display to start a new transaction.

17. The automated self-checkout method of claim 16 further including requiring a user identification entry before allowing the user to proceed with the current transaction.

18. The automated self-checkout method of claim 15 further including monitoring the purchaser transaction wherein the controller directs a monitoring system to monitor and record the purchaser transaction and to conclude monitoring upon completion of the purchaser transaction.

* * * * *

UNITED STATES PATENT AND TRADEMARK OFFICE
CERTIFICATE OF CORRECTION

PATENT NO.       : 8,825,531 B1
APPLICATION NO.  : 13/106090
DATED            : September 2, 2014
INVENTOR(S)      : Catoe Page 1 of 1

It is certified that error appears in the above-identified patent and that said Letters Patent is hereby corrected as shown below:

In the Claims

Claim 8, Column 9, line 5, the word "form" should be --from--

Signed and Sealed this
Eleventh Day of November, 2014

Michelle K. Lee
*Deputy Director of the United States Patent and Trademark Office*